Aug. 25, 1925.
C. E. DURYEA
1,550,791
POWER TRANSMITTING MECHANISM
Original Filed Aug. 12, 1920    2 Sheets-Sheet 1
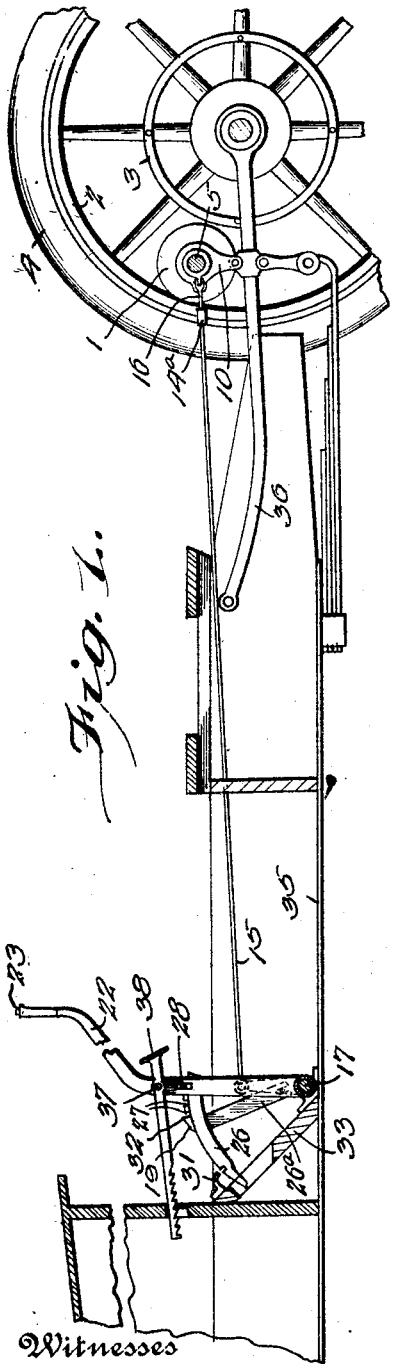
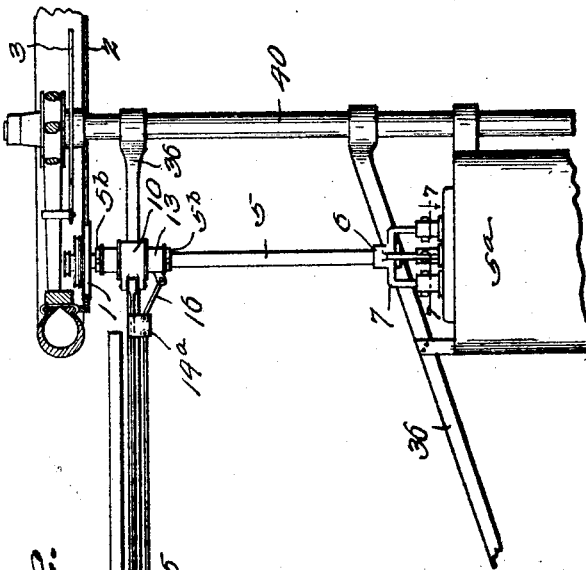
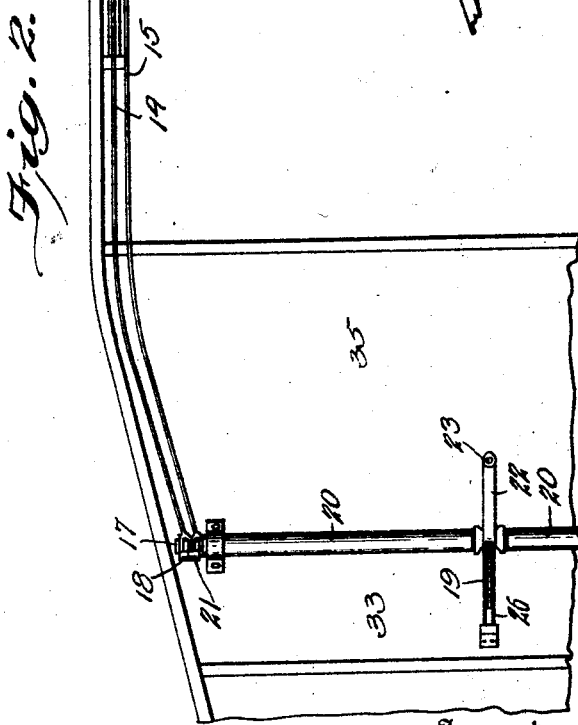

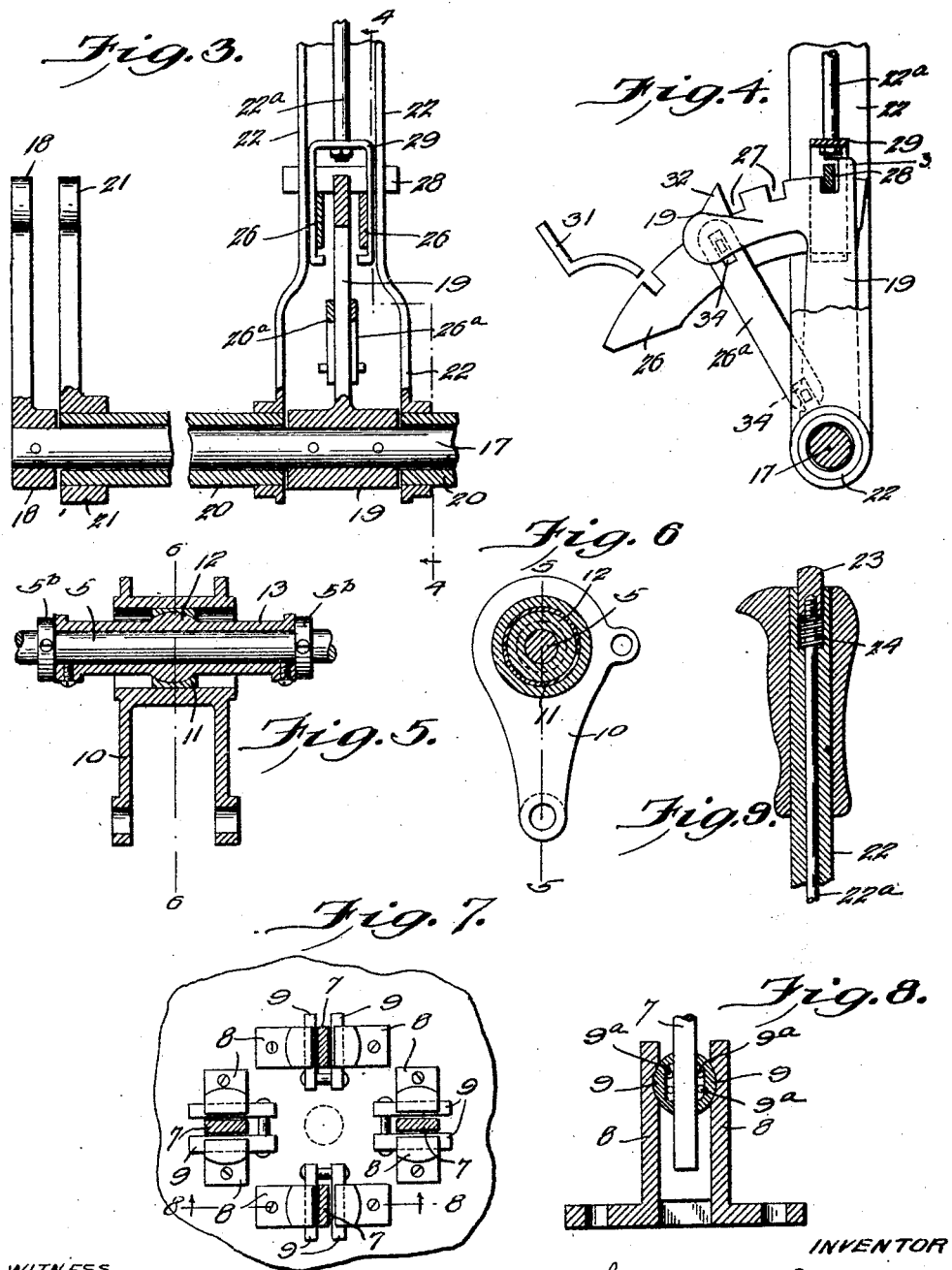

Patented Aug. 25, 1925.

1,550,791

UNITED STATES PATENT OFFICE.

CHARLES E. DURYEA, OF PHILADELPHIA, PENNSYLVANIA.

POWER-TRANSMITTING MECHANISM.

Application filed August 12, 1920, Serial No. 402,978. Renewed February 3, 1925.

*To all whom it may concern:*

Be it known that I, CHARLES E. DURYEA, a citizen of the United States, residing at Philadelphia, in the county of Philadelphia and State of Pennsylvania, have invented certain new and useful Improvements in Power-Transmitting Mechanism, of which the following is a specification.

This invention relates to power transmitting mechanism and more particularly to forms adapted to automobile use.

It has for its objects among others to simplify the mechanism used to secure the various speeds desired with greater certainty of action coupled with durability.

I provide an improved runner and link action for shifting the bearing, an improved universal joint, and a control group, the latter having journals around the gear change tubes at an angle made by the toe-board and floor and constituting a unit in that it can be placed in position after being assembled.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a vertical loingitudinal section with parts broken away.

Figure 2 is a view in top plan with parts in section and portions broken away.

Figure 3 is an enlarged sectional detail through the control mechanism.

Figure 4 is a vertical section as on the line 4—4 of Figure 3.

Figure 5 is a section on the line 5—5 of Figure 6.

Figure 6 is a section on the line 6—6 of Figure 5.

Figure 7 is an enlarged section taken on the line 7—7 of Figure 2, looking in the direction of the arrows.

Figure 8 is a section on the line 8—8 of Figure 7, looking in the direction of the arrows.

Figure 9 is an enlarged sectional detail of the change lever and handle.

Like numerals of reference indicate like parts throughout the several views.

To accomplish the desired ends, I make use of gears of the grooved friction type and secure the desired reduction in speed between the engine and the wheels by a single step due to making the driving members 1, termed grooved rollers, of small diameter and the driven members 2, termed rings, of quite large diameter. These rings are preferably attached to the driven wheels and revolve synchronously with the wheels. For securing a change of speed or, in other words, a different gear ratio between the engine and the wheels, I use several sizes of rollers 1 and to secure a reverse action I place driven members 3 on the wheels of smaller size and so placed that they may be engaged by the opposite sides of the driving members 1. Since the rollers are small, it will be seen that they can be more cheaply made and more readily changed for other sizes than could the rings which are much larger.

To engage any one of the roller sets requires that the desired roller be shifted into the plane of the ring on its respective wheel 4 and then caused to gradually contact with the ring until the driving of the wheel is properly taken up. In short, this mechanism acts both as clutch and gear and applies to both driven wheels of the car at once. While the wheels of the car could be moved to secure these effects, it is easier to move the rollers, and the mechanism described herein is designed for this purpose. While the placing of the rollers and rings on the drive shaft could be such that the shaft could be solidly constructed and moved bodily to one side to effect the gear changes, I prefer to make the two ends duplicates of each other and engage wheels which also are duplicates as to their ring arrangement. This arrangement requires means for telescoping these separate shaft ends into a central section or into the ends of the engine crank shaft. The arrangement shown places the large or high speed rollers inside of the lower ones in the relation to the plane of the wheel, so that to bring the high roller into the ring plane the shaft 5 must be carried outwardly and to engage the lowspeed roller it must be telescoped inwardly. While it is possible to move the whole shaft combination fore and aft to get the driving contact for the rollers with the rings, I prefer to allow the engine 5ª to stand stationary on the frame 40 which also carries the driven members 2 and 3 and the propelling vehicle wheels 4, and to get the contact by swinging the ends of the roller shaft 5 forward. This preferred construction particularly applies to light auto construction in which a single friction groove suffices to transmit all the power required to propel one wheel of a light auto. If several grooves are used, all of the same diameter, and several rings to engage them, it may not be practical to swing the shaft ends and so may be necessary to move the shaft 5 and the engine 5ª together fore and aft, or even to hold the shaft 5 stationary and swing the vehicle wheels.

Having now described the general action of the device, I refer more particularly to the mechanism used to get this desired action. At the junction of the engine shaft with the inner end of the roller shaft 5, I provide a joint 6, Figures 2, 7 and 8, which permits both the sliding of the roller shaft 5 endwise and also the angular placing of the shaft 5 to get the rollers 1 into contact with the ring 2. This type of joint is known as a universal or gimbal joint, but my device requires one provision not required by the more common forms of joints and this requirement is freedom from looseness or considerable elasticity. If there is much looseness or elasticity, the engaging of the roller 1 and ring 2 is accompanied by a chatter which is objectionable due to the roller taking a grip and then letting go its grip in rapid succession; whereas if properly constructed it takes hold smoothly and slips like a perfect clutch until the vehicle has acquired speed when further pressure causes the roller to maintain a positive contact driving practically as would a toothed gear. This desired effect is obtained by the special joint designed for this work and consisting of a multiplicity—three or four—of arms 7 equally spaced about the roller shaft and axis and projecting parallel thereto. On the engine shaft end are four lugs 8 bored to carry the arms 7 mentioned above. In each bore are placed two half oval pieces 9 which rest against the surfaces of the arm 7 therein with their flat surfaces and fit the bore with their curved surfaces. A pin through their inner ends passes just below the arm 7 and prevents centrifugal force from throwing them out of the bore. A pin through the outer ends also may be used, but usually the construction is such that they cannot fall nearer to the shaft axis. It will be seen that the curved surfaces fitting the bore permit angular movement of the arm while the flat surfaces bearing against the flat sides of the arm permit the sliding needed for speed changing and the angular movement that comes in the plane of axis and radius represented by the arm. If this joint wears, it may be made tight again by inserting a shim of thin steel between the flat surface of arm 7 and oval 9 or even between the curved surfaces. It may also have one or more grooves nearly across the flat surface of the oval in which groove two or more steel balls 9ª may be placed to provide a rolling friction for the flat surface of the arm. This provision insures free movement even though the parts be forced together very tightly and certainly free from looseness.

The bearing for supporting this swinging shaft 5 also must permit two movements. My preferred method is to support it by a swinging hanger 10 in which is a sliding bearing 11 having inside it a socket and ball 12, which ball is on or a part of the bearing proper 13. This permits any angularity that may occur and also allows the sliding to bring the rollers 1 into line with the rings 2.

Collars 5ᵇ on the shafts 5 prevent it sliding in the bearing 13 but permit free rotation. This socket portion enclosing the ball 12 is in two halves which when worn may be shimmed by a band of thin steel around them.

The operating means for moving and applying the parts thus far described consist of a control group at the toe-board and of a rod 14 running back to the hanger 10 and a second rod 15 by which a sliding runner 14ª may be moved along the first rod 14 near the hanger 10. A link 16 from the runner 14ª to the bearing proper 13 which has a lug to receive this link, completes the mechanism. It is apparent that if the runner 14ª is pulled forward, the link 16 operating at more or less of an angle will force the bearing outward and carry the shaft 5 and rollers 1 outward with respect to the plane of the vehicle wheel 4.

The control group, in part, consists of an application rod 17 across the floor of the car at the toe-board. This rod carries two arms 18 at its ends which are attached to and operate the hanger, as described above; while at the center the gear change segment 19 is attached to it. Around this rod are the gear change tubes 20 both connected to the change lever 22 and having at their ends two arms 21 which operate the runner rods 14 and 15. The change lever 22 is, therefore, bifurcated so as to provide space between its ends near the center of the rod 17 for the segment 19, also to accommodate the releasing wire 22ª. A thumb button 23 and spring 24 at the upper end of the lever and inside the handle fitted thereon, see Figure 9, serve to depress the neutral latch 26 and return it when it is in the neutral position. In the segment 19 are notches 27 corresponding to the number of rollers and speeds,—there being three shown. A wire 22ª passes down from the thumb button 23 to a cross pin 28 carried by an operating claw 29. Normally the claw 29 is up, the latch 26 engaged onto the stop 31 and the cross pin 28 free from the notches 27 in the segment 19. The control lever 22 may then be swung freely in relation to the segment 19. The control lever 22 may then be swung freely fore and aft which shifts the rollers out and in respectively. Stops 32 limit the movement since there is no provision for movement greatly beyond that needed to properly position the rollers. When, for example, the cross pin 28 reaches the forward end of the segment 19, a push down on the thumb button 23 depresses the cross pin 28 and sends it into the high speed notch and also at the same time forces the neutral latch 26 down so as to free it from the stop 31 and permit the segment 19 to be moved forward and thus apply the high speed rollers to their rings or to permit it to be swung backward which brings the smallest rollers against the reverse rings 3 for reversing. So long as the neutral latch 26 is up, the segment 19 cannot be moved because the stop 31 is fixed to the toe-board 33 and the latch 26 is carried on the segment 19 by means of two pins 34, 34 on which it is slotted to permit movement, practically radial, but not to permit it to move in an angular direction except with the segment 19. The entire control group is journaled in bearings around the tubes 20 at the angle made by the toe-board 33 and floor 35, and is a unit in that it can be placed in position after being assembled. The hanger and runner rods 14, 15 lie along the sides of the car body where they are out of the way and where a carpet or other covering may be carried up over them.

Since the wheels rise and fall with the car axle and since the rollers must maintain a fairly constant pressure against the rings, it is advisable that the hangers for the roller shaft bearings be on radius rods 36. The engine can also be carried on these rods or else there will be considerable angularity of the universal joints due to the spring action and it is because of this that the roller action of the balls is necessary or advisable in the said joints. That the radius rods may not swing in such an arc as to tighten and loosen them, they should be pivoted well forward toward the control group and practically in the plane of the rods, and it is even advisable to support the rods at the pivot line to insure that the spring action does not carry them above or below the pivot point. Some tolerance is provided by making the control rod 17 slightly elastic so that it permits irregularities while still maintaining contact. After the hand is used for gear changing and releasing from the neutral stop 31, it is commonly preferred to apply the pressure and release it as the needs of driving demand by the use of a foot so that there is fitted to the lever 22 a cross pin 37 on which is mounted a pedal 38 with ratchet teeth to its extension. A catch plate on the toe-board permits fastening the pedal in any desired position and so relieves the necessity of holding the pressure to keep the drive operating. Since the gear change lever is swung backward to select low gear, and since the low gear roller, being smaller than the high, must be carried further forward, it is evident that when the power is being applied the position of the pedal 38 and lever 22 is approximately the same no matter which speed is being used. It is also evident that the pedal extension needs but a few teeth since the same teeth are used for each of the several speeds. It is also evident that more than three speeds may be provided if desired by increasing the number of rollers 1 and the length of the segment 19 with a proper number of notches, of course.

My joint, above described, not only possesses the requisite rigidity, but provides ability to slide, to transmit power at an angle together with great freedom from chatter.

From the foregoing, it will be evident that I have devised a simple, yet efficient, reliable and durable mechanism for the purpose stated, and while the construction as hereinbefore set forth is what I, at the present time, consider preferable, the same is subject to changes and variations and modifications in details of construction, arrangement of parts etc., without departing from the spirit of the invention or sacrificing any of its advantages. I, therefore, do not intend to limit myself to the exact construction hereinbefore described, but reserve the right to make such changes, variations and modifications as come properly within the scope of the appended claims.

What I claim as new is:—

1. In a driving mechanism of the class described, driven friction members, driving friction members, and a runner and link mechanism including an angularly-disposed member for causing either of the driving members to drive at the will of the operator said angularly disposed member connecting the runner with the bearing of the friction drive members.

2. In a driving mechanism of the class described, friction members mounted to revolve synchronously with the wheels of the vehicle, cooperating friction members, a drive shaft means within the bearing of said shaft permitting sliding movement and angularity of said shaft and a control group and means for moving one set of members toward and from the other.

3. In a driving mechanism of the class described, friction members mounted to revolve synchronously with the wheels of the vehicle, cooperating friction members, a drive shaft and a control group, means within the bearing of said shaft permitting sliding movement and angularity of said shaft, the latter constituting a unit said shaft being endwise movable to carry one set of said friction members toward the other.

4. In a friction driven motor vehicle, friction members revoluble synchronously with the vehicle wheels, cooperating friction members, a drive shaft, a bearing therefor, and means within the bearing of the shaft whereby said shaft is allowed to swing and move endwise.

5. In a friction drive motor vehicle, friction members revoluble synchronously with the vehicle wheels, cooperating friction members, a drive shaft, a bearing therefor, means within the bearing of the shaft whereby said shaft is allowed to swing, and means whereby said shaft is allowed to slide simultaneously with its swinging movement.

6. In a friction driven motor vehicle, a friction member movable synchronously with the wheel, a cooperating friction member, a swingingly mounted drive shaft therefor, and means within the bearing of said shaft permitting endwise movement and angularity of said shaft.

7. In a friction driven motor vehicle, a friction member movable synchronously with the wheel, a cooperating friction member, a swingingly mounted drive shaft therefor, and means within the bearing of said shaft permitting angularity of said shaft as well as sliding movement thereof.

8. In a friction driven motor vehicle, a friction member positively movable synchronously with the wheel of the vehicle, a cooperating friction member, a swingingly mounted drive shaft therefor, a bearing for said shaft a runner and link mechanism including an angularly-disposed member for shifting the bearing, and a universal joint interposed between the said shaft and the motor, said angularly-disposed member connecting the runner with the bearing of the friction drive members.

9. In a friction driven motor vehicle, a friction member positively movable synchronously with the wheel of the vehicle, a cooperating friction member, a swingingly mounted drive shaft therefor, a bearing for said shaft a runner and link mechanism including an angularly-disposed member for shifting the bearing, a universal joint interposed between the said shaft and the motor, and a control group said angularly-disposed member connecting the runner with the bearing of the friction drive members.

10. In a friction driven motor vehicle, a friction member positively movable synchronously with the wheel of the vehicle, a cooperating friction member, a swingingly mounted drive shaft therefor, a bearing for said shaft a runner and link mechanism including an angularly-disposed member for shifting the bearing, a universal joint interposed between the said shaft and the motor, and a control group, the latter constituting a unit said angularly-disposed member connecting the runner with the bearing of the friction drive members.

11. In a friction driven motor vehicle, cooperating friction members, a drive shaft, a universal joint at one end of said shaft, a bearing for said shaft slidable therewith, a control group constituting a unit, and a runner and link mechanism including an angularly-disposed member for shifting the bearing and shaft in the direction of the length of the latter.

12. In a friction driven motor vehicle, cooperating friction members, a drive shaft, a universal joint at one end of said shaft, a bearing for said shaft slidable therewith, a control group constituting a unit, and a runner and link mechanism including an angularly-disposed member for shifting the bearing and shaft in the direction of the length of the latter, said runner and link mechanism being operatively connected with the control group.

13. In a friction driven motor vehicle, cooperating friction members, a drive shaft carrying one of said members, and means within the bearing of said shaft permitting both the sliding of said shaft endwise and also the angular placing thereof to bring the driven and driving friction members into contact with each other.

14. In a friction driven motor vehicle, cooperating friction members, a drive shaft carrying one of said members, and means permitting both the sliding of said shaft endwise and also the angular placing thereof to bring the driven and driving friction members into contact with each other, the same embodying a universal joint within the bearing of said shaft.

15. In a friction driven motor vehicle, cooperating friction members, a drive shaft carrying one of said members, means permitting both the sliding of said shaft endwise and also the angular placing thereof to bring the driven and driving friction members into contact with each other, the same embodying a universal joint within the bearing of said shaft, and means whereby looseness and elasticity are prevented.

16. In a friction driven motor vehicle, cooperating friction members, a drive shaft carrying one of said members, means permitting both the sliding of said shaft endwise and also the angular placing thereof to bring the driven and driving friction members into contact with each other, the same embodying a universal joint within the bearing of said shaft, and means whereby looseness and elasticity are prevented, said means acting both as a clutch and gear.

17. In a friction driven motor vehicle, cooperating driving and driven friction members, a swinging shaft carrying one of said members, a sliding bearing for said shaft, and means within said bearing permitting angularity as well as sliding movement thereof.

18. In a friction driven motor vehicle, a universal joint permitting both angular and sliding action with freedom from looseness, a runner and an angularly disposed link adapted to produce sliding action while permitting angular positioning of the shaft carried by said joint and a swinging bearing combined with a control unit by means of which the sliding and swinging actions are produced, consisting of a change lever, a cross bar and push button for engaging said lever to a notched segment and a pedal for applying pressure to and retaining the said parts in operative position.

In testimony whereof I affix my signature.

CHARLES E. DURYEA.